S. BARUCH.
SEAL AND KNOT PROTECTOR.
APPLICATION FILED JULY 12, 1912.
1,074,769.
Patented Oct. 7, 1913.
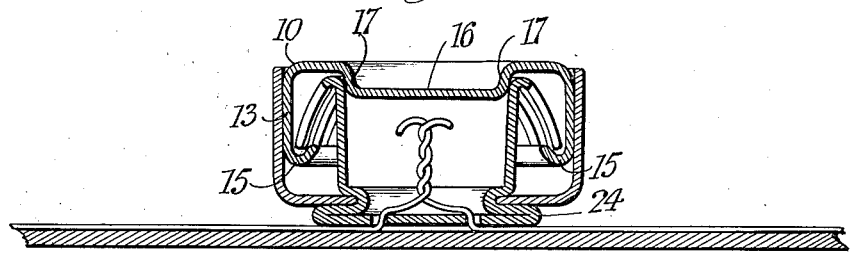
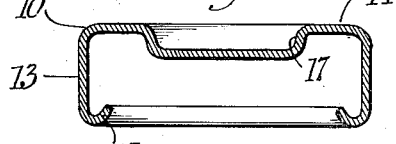
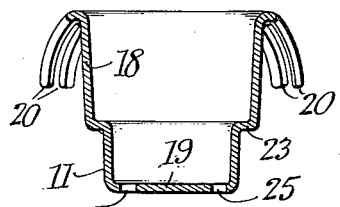
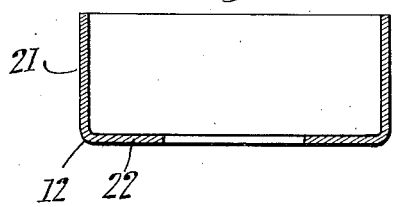
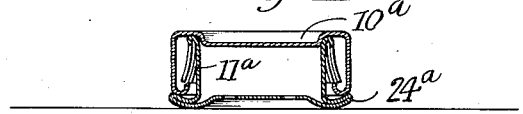
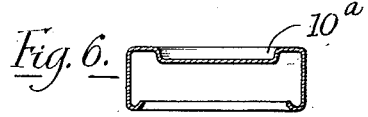
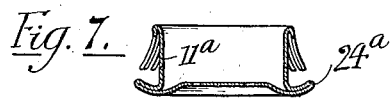
Witnesses:
Samuel Baruch
Inventor
by C. W. Fairbank
Attorneys

UNITED STATES PATENT OFFICE.

SAMUEL BARUCH, OF NEW YORK, N. Y.

SEAL AND KNOT PROTECTOR.

1,074,769.  Specification of Letters Patent.  Patented Oct. 7, 1913.

Application filed July 12, 1912. Serial No. 708,954.

*To all whom it may concern:*

Be it known that I, SAMUEL BARUCH, a citizen of the United States, and a resident of the city of New York, borough of Manhattan, in the county and State of New York, have invented a new and Improved Seal and Knot Protector, of which the following is a full, clear, and exact description.

This invention relates to certain improvements in seal and knot protectors and more particularly to the construction shown in United States Patent No. 967,002, granted August 9, 1910, to myself and Morris Dessauer. In the construction shown in said patent, there are two telescoping members having such interlocking engagement that when assembled they cannot be separated without mutilation, and so constructed as to form a cavity or chamber upon the interior which may receive and protect a knot or two united ends of cord or wire.

One object of my present invention is to facilitate the assembling of the two members. To accomplish this, I form the flange of one of the members of a plurality of separate spring fingers so that the free edge of the flange may be more easily bent during the assembling and the failure of one or more of the fingers to spring back into place after the assembling will not interfere with the proper locking together of the members.

A further object of my invention is to prevent the insertion of an instrument lengthwise between the two members to distort the flange of one or both of the members and thus permit the separation of the members. To accomplish this, I provide the inner member with means adjacent its closed end which will extend outwardly and present an annular wall opposite the annular space between the members. This annular wall may, and preferably does, have a peripheral flange encircling the outer member so as to leave an annular recess or chamber in one member into which the wall of the other member may extend.

A further object of my invention is to prevent the inward bending of the free edge of the annular wall of the inner member, and to accomplish this, I provide the end wall of the other member with an inwardly-projecting countersunk portion serving as a stop encircled by the inner member.

Reference is to be had to the accompanying drawings, forming a part of this specification, in which similar characters of reference indicate corresponding parts in all the figures, and in which—

Figure 1 is a central longitudinal section through a device constructed in accordance with my invention and showing in section a portion of a package wall; Fig. 2 is a central longitudinal section through one of the two members prior to assembling; Figs. 3 and 4 are central longitudinal sections through the two pieces going to make up the other section and prior to their permanent assembling; Fig. 5 is a central longitudinal section through a modified form, and Figs. 6 and 7 are central longitudinal sections through the two members going to make up the fastener shown in Fig. 5.

In the form shown in Fig. 1, I employ two members, one of which I designate the outer member and which is formed of a single section 10, and the other of which I designate the inner member and which is formed of two sections 11 and 12 permanently connected together. All three of the sections are formed of stamped, spun, or otherwise fashioned sheet metal, the character and thickness of which is dependent upon the use for which the completed device is designed. The section 10 has a peripheral wall 13 and an end wall 14, so that the section somewhat resembles a cup. At the open end of the cup the peripheral wall is bent inwardly and backwardly toward the end wall, so as to form a flange 15, although preferably, this flange extends toward the wall 14 such a slight distance that it may be considered merely as a ledge or shoulder. The end wall 14 is provided with a central countersunk portion 16 presenting an annular shoulder 17, the function of which will be pointed out more particularly hereinafter.

The inner member in the form shown in Figs. 1, 3 and 4, includes two separate sections as previously stated. The section 11 constitutes the main section and includes a peripheral wall 18 and an end wall 19, so that this member also somewhat resembles a cup. At the open end, the peripheral wall is provided with a peripheral flange bent outwardly and backwardly, so as to lie at an angle to the peripheral wall, and this flange is preferably made up of a series of separate spring fingers, the free ends of which are independently movable toward and from the peripheral wall. The section 12 of the inner member does not form part of the lock but serves only as a guard for the interlocking parts of the members and has merely a peripheral wall 21 and an end wall 22, the latter being provided with a large central perforation so that the end wall in reality constitutes nothing more than an inwardly-directed flange. In fashioning the section 11, I preferably leave a shoulder 23 intermediate of the ends of the peripheral wall, and fashion the portion between said shoulder and the end wall 19, of somewhat smaller diameter than the portion between said shoulder and the open end of the section. The opening in the section 12 is made of such size that it will receive the reduced portion of the section 11 and the end wall or flange 22 may rest against the shoulder 23. The end wall 19 is then struck down, so as to form a bead or flange 24, which will positively lock the sections 11 and 12 together and hold the flange 22 between the shoulder 23 and the bead 24, as is shown in Fig. 1. Either the end wall 19 or the end wall 16, but preferably the former, is provided with two perforations 25, through which the ends of a cord or wire may be extended and permit the formation of the knot upon the interior of one of the cups.

In the use of my improved device, a package, box or other container, is first securely wrapped and tied with cord or wire, and the free ends of said cord or wire are extended through the two perforations 25 and formed into a knot or otherwise united within the chamber or cavity of the section 11. The member 10 is then telescoped with the other member until the spring fingers slip past the flange 15, and the two members will now be held together so that it is impossible to separate them without mutilation.

The shoulder 17 is made of such diameter that it will fit within the open end of the peripheral wall 18 and act to center the latter and positively prevent said peripheral wall from being bent inwardly to disengage the spring fingers 20 from the flange 15, and the member 12 projects outwardly approximately in the plane of the end wall of the section 11 and thus extends across the annular chamber or recess between the two sections. With the open end of this recess projected in this manner, it is impossible to extend any instrument or tool into engagement with either of the flanges 15 or 20, so as to mutilate or distort them and permit the separation of the sections. Even if the bead 24 were bent upwardly and the section 21 removed, the shoulder 17 would prevent any inward bending of the peripheral wall 18.

In Figs. 5, 6 and 7, I have illustrated a slightly modified construction in which the portions are somewhat varied and in which the section 12 is omitted. In this form, I employ an outer member 10ª corresponding to the member 10, and an inner member 11ª corresponding to the member 11. Instead of utilizing a separate section 12 to protect the annular space between the two sections, I make a bead 24ª corresponding to the bead 24 but of somewhat greater width and extending outwardly to substantially the periphery of the outer member 10ª. By extending the bead outwardly in this manner, I accomplish substantially the same result although a greater stretching of the metal is required.

Having thus described my invention, I claim as new and desire to secure by Letters Patent:

1. A seal and knot protector including two telescoping members, each having an end wall and a peripheral wall, and interengaging flanges at the open ends of said members, a portion of the end wall of the outer member being countersunk to project into the open end of the inner member.

2. A seal and knot protector including two telescoping members, each having an end wall, a peripheral wall, and interengaging portions extending backwardly from the open ends to prevent the separation of the members, one of said members having an inwardly-projecting portion at its closed end for registry with the open end of the inner member.

3. A seal and knot protector comprising two telescoping members, each having an end wall and a peripheral wall, interengaging portions on said members for preventing their separation, and an annular flange on the inner member at its closed end for preventing the insertion of an instrument lengthwise between said members.

4. A seal and knot protector comprising two telescoping members, each having an end wall and a peripheral wall, interengaging portions on said members for preventing their separation, and a separate section on the inner member at its closed end and encircling said inner member for preventing the insertion of an instrument lengthwise between said members.

5. A seal and knot protector including two telescoping members each having an end wall and a peripheral wall integral therewith, the peripheral wall of the inner member having a plurality of spaced spring fingers extending backwardly and outwardly from its open end and the peripheral wall of the outer member having a continuous annular inwardly extending flange or ledge at its open end and adapted to engage with the free ends of said spring fingers, and the end wall of said outer member having a portion bent inwardly to lie within the open end of the inner member.

6. A seal and knot protector including two telescoping members each having an end wall and a peripheral wall integral therewith, the peripheral wall of the inner member having a plurality of spaced spring fingers extending backwardly and outwardly from its open end and the peripheral wall of the outer member having a continuous annular inwardly extending flange or ledge at its open end and adapted to engage with the free ends of said spring fingers, and the end wall of said inner member being of larger diameter than the peripheral wall portion thereof and presenting an outwardly extending bead opposed to the open end of the outer member.

7. A seal or knot protector comprising two telescoping members each having an end wall and a peripheral wall integral therewith, inter-engaging portions on said members for preventing their separation, and a separate section on the inner member at its closed end for preventing the insertion of an instrument lengthwise between said members, said separate section being held in place in a groove formed between the end wall and peripheral wall of the inner member.

Signed at New York in the county of New York and State of New York this 11th day of July A. D. 1912.

SAMUEL BARUCH.

Witnesses:
    JAMES D. BROWN,
    C. W. FAIRBANK.